June 20, 1961  B. J. NYBERG  2,989,353
ROLLER BEARING
Filed Jan. 19, 1959  2 Sheets-Sheet 1
FIG. 1.
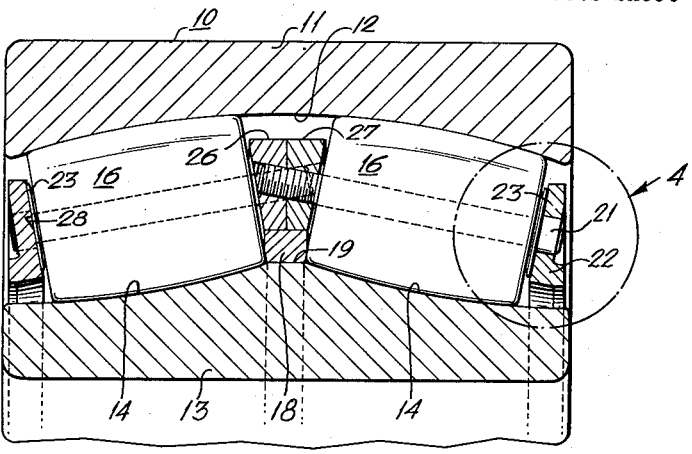
FIG. 2.
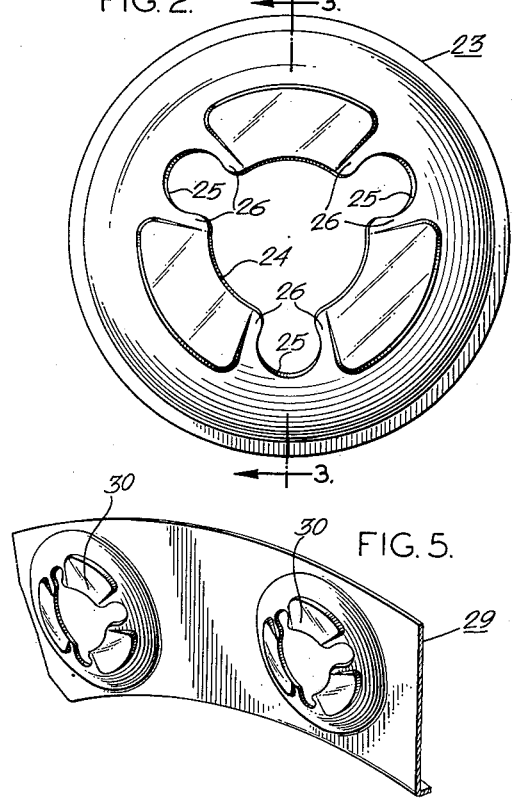
FIG. 3.
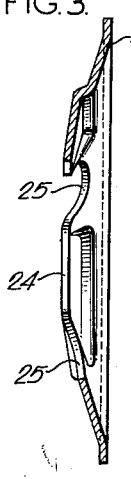
FIG. 4.
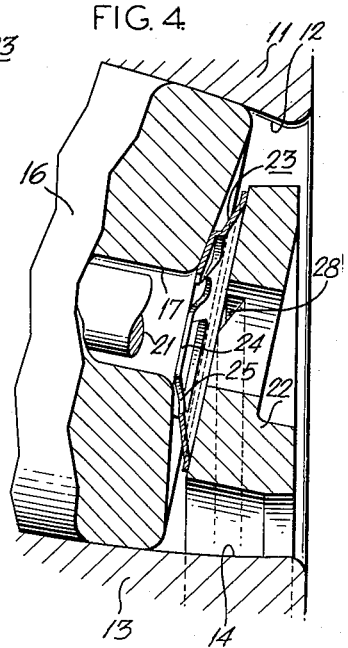
FIG. 5.
INVENTOR:
BENGT JOHAN NYBERG
BY Howson & Howson
ATTYS.

June 20, 1961   B. J. NYBERG   2,989,353
ROLLER BEARING
Filed Jan. 19, 1959   2 Sheets-Sheet 2

INVENTOR:
BENGT JOHAN NYBERG
BY Howson & Howson
ATTYS.

United States Patent Office 2,989,353
Patented June 20, 1961

2,989,353
ROLLER BEARING
Bengt Johan Nyberg, Goteborg, Sweden, assignor to Aktiebolaget Svenska Kullagerfabriken, Goteborg, Sweden, a corporation of Sweden
Filed Jan. 19, 1959, Ser. No. 787,579
8 Claims. (Cl. 308—212)

The present invention relates to roller bearings, and more particularly to bearings having means for biasing the rollers against one or more guide rings or flanges.

The rollers of roller bearings are conventionally guided either between a pair of flanges, as is usual in cylindrical roller bearings, or by engagement with a single flange against which they are pressed by the resultants of the forces acting upon the respective rollers from the races, as is the case in taper roller bearings or in spherical roller bearings with unsymmetrical rollers. In spherical roller bearings with symmetrically loaded symmetrical rollers, there is, however, no flange pressure. In this case, the rollers must be guided by a cage.

All of the above-mentioned ways of guiding the rollers suffer from certain considerable disadvantages. When a roller enters the unloaded zone of the bearing, it is no longer subjected to guiding forces. Because of the play in the bearing which exists in the unloaded zone, the roller can lose contact with the races, flanges or cage. The roller can then assume an oblique position, or shift position axially and its rotation may be retarded or cease entirely. When entering the loaded zone of the bearing, the roller must reassume its correct working position and/or accelerate. The sliding and sudden jerks thus occurring due to these changes in position, disturb the smooth running of the bearing and shorten its life.

One way of avoiding these disturbances is to subject the rollers to an axial force to maintain the rollers in engagement with a guiding flange. It has been proposed to use for this purpose an elastic ring located concentric with the race rings. This device, however, is also subject to certain disadvantages. Thus, if one of the rollers assumes an oblique position, the ring will be forced outwards and its pressure against the adjacent rollers will lessen or cease entirely. Similarly, small differences in the lengths of the rollers within the length tolerance range may result in a condition wherein a short roller will not be subjected to any axial pressure.

The present invention has for its purpose reducing the friction in the bearing and at the same time providing for satisfactory guidance of the rollers. It relates to roller bearings having a guide flange at one end of the rollers and resilient means at the other end thereof for pressing the roller ends against the said guide flange. The invention is characterized mainly in the provision of an individual resilient member opposite each roller, the said resilient member being adapted to exert a pressure on its appurtenant roller only.

Various embodiments of the invention are illustrated in the accompanying drawing in which:

FIG. 1 is a fragmentary axial sectional view of a spherical roller bearing embodying the present invention;

FIG. 2 is a plan view on enlarged scale of a resilient washer which functions in the bearing to press an individual roller against a guide flange;

FIG. 3 is a sectional view along the lines 3—3 of FIG. 2;

FIG. 4 is a sectional view at an enlarged scale of the portion of the bearing shown by the circle 4 in FIG. 1;

FIG. 5 is a fragmentary perspective view of a ring embodying resilient portions for pressing the rollers against a guide flange in accordance with the invention;

Figure 6:
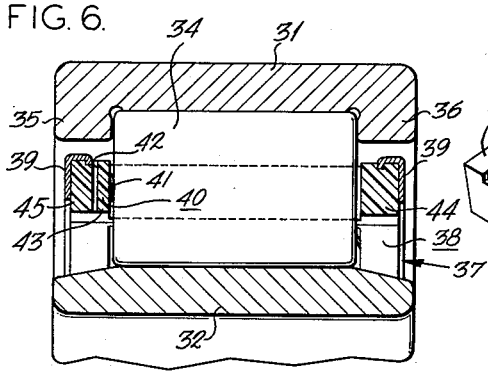
FIG. 6 is a fragmentary axial sectional view of a cylindrical roller bearing embodying the present invention.

In the embodiment of the invention shown in FIGS. 1 to 4 inclusive, the numeral 11 indicates an outer race ring of a double row bearing 10 having a spherical raceway 12 common to both rows of rollers. An inner race ring 13 is provided with a pair of raceways 14, one for each of the two rows of rollers 16. A guide ring or flange 18 is located between the rows and is centered on but axially displaceable relative to a cylindrical surface 19 of the inner race ring. On the guide ring 18, is centered an inner cage ring comprising a pair of split rings 26 and 27. The rollers 16 are provided with axially extending bores 17 concentric with their axes. Pins 21 are located within the bores 17, the inner ends thereof being connected to the inner cage rings 26 and 27 and the outer ends thereof being provided with cylindrical heads which are connected in any suitable manner, for example by welding, to outer cage rings 22 located axially outside of the outer roller ends. In this manner, an interconnected unit is formed comprising the inner race ring 13, the guide ring 18, the inner cage rings 26 and 27, the outer cage rings 22, the pins 21 and the rollers 16.

Between the outer end of each roller 16 and the cage ring 22, is located a resilient cupped washer 23, the axial height of which is somewhat greater than the total axial play between the roller and the guide ring 18 at the one end and the outer cage ring 22 at the other end so that the washer will exert a thrust on the roller which keeps it pressed with an appropriate force against the ring 18 during a whole revolution, i.e., while it is passing through both the loaded and unloaded zones of the bearing. It is noted that resilient force against one outer cage ring is opposed by a similar resilient force against the opposite outer cage ring so that the reaction forces center the cage relative to the guide ring 18.

The resilient washer 23 is illustrated in FIGS. 2, 3, and 4. It is preferably made of spring steel and is circular in form having a centrally located hole 24 which fits easily on the pins 21. It is slightly cupped, as may be seen from FIG. 3, and the central portion of its convex surface is ground spherical. Its resiliency is increased by the provision of three notches 25 in the edges of the hole 24. To prevent the edges of the notches from scraping against the ends of the rollers, they are slightly depressed as shown at 26 in FIGS. 2 and 4. This also serves the purpose of improving the lubrication between the washer and its roller.

In order to improve the lubrication between the rollers 16 and the pins 21, the outer cage ring is provided with a groove 28 concentric with the cage ring as shown in FIG. 4. The groove is of triangular cross section and has one corner opposite the pitch circle of the rollers. The groove 28 serves to collect lubricant which is fed into the groove by the rotation of the rollers from which it is fed between the rollers 16 and the pins 21.

As shown in FIG. 5, the resilient means for urging the rollers against the guide ring need not consist of separate washers, but the resilient means may comprise a ring 29 concentric to and intermediate the race rings and having resilient projections thereon, for example resembling the washers 23 as shown at 30, which engage each of the rollers and bias the same toward the guide ring.

Figure 9:
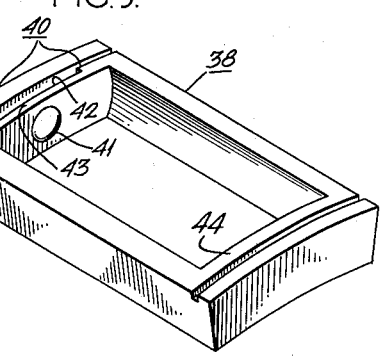
FIG. 9 is a detached perspective view of one section of the roller cage shown in FIGS. 6–8.
Figure 7:
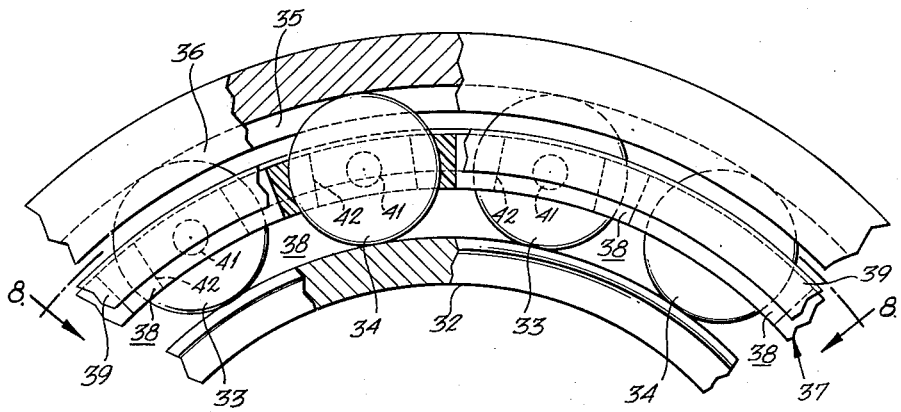
FIG. 7 is a fragmentary view in side elevation and partially in section of the bearing shown in FIG. 6.
Figure 8:
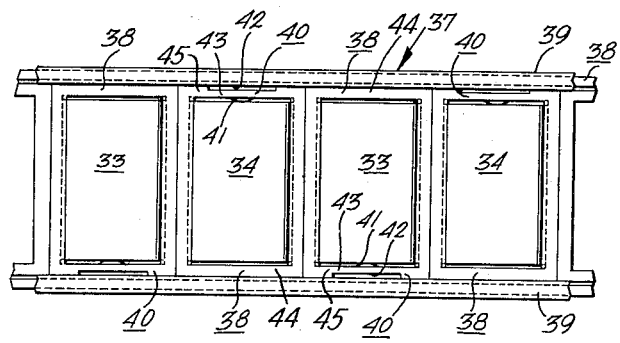
FIG. 8 is a sectional view developed on the line 8—8 of FIG. 7.

The invention is not limited to the forms described. It may for example be applied to cylindrical roller bearings in which the rollers are guided between a pair of flanges, for example as shown in FIGS. 6-9. In these figures, the illustrated cylindrical roller bearing has an outer race ring 31, and an inner race ring 32 which mount between them rollers designated alternately 33 and 34. One of the race rings, in the present instance, the ring 31, is provided with flanges 35 and 36 which with a cage 37, guide the rollers 33 and 34. The cage 37 is comprised of a plurality of cage sections 38, in the present instance one for each roller, having end walls 44 and 45 rigidly held together by two metallic rings 39 to form cage rings. Each cage section 38 is provided at one end wall 45 with a resilient portion 40 comprising, in the present instance, a projection 41 of plastic material which contacts the end of the roller. A slit 42 is provided behind the projection 41 in the cage section whereby the portion 43 between the slit 42 and the projection 41 is made yielding and resilient. Preferably, the cage members 38 are assembled in the cage 37 so that the alternate rollers 33 are biased in a direction toward the flange 35 while the intermediate rollers 34 are biased toward the flange 36. In this manner, the resilient force against one cage ring is opposed by the resilient force against the opposite cage ring and the cage 37 is centered relative to the guide flanges 35 and 36, and clearance is left between each roller and the wall 44 of the cage section which is opposite the resilient portion 40 (see FIG. 6).

The force required to press the rollers against the flanges may of course be created by members formed in other ways. It is thus possible to use separate washers mounted in the cage similar to the washers 23, or to use a ring concentric to the race rings and having separate resilient members, for example resembling the ring 29 described above. The design of the cage may vary and the invention may be applied to hollow rollers or solid ones. The resilient member or parts thereof may be integral with the cage.

While particular embodiments of the invention have been herein illustrated and described, it is not intended to limit the invention to such disclosure, but changes and modifications may be made therein and thereto within the scope of the following claims.

I claim:

1. A roller bearing having rollers, a cage having cage rings receiving therebetween said rollers, inner and outer race rings, guide flange means mounted on one of said race rings and having roller-end-engaging wall means projecting toward the other of said race rings and engaging the axial ends of rollers in said cage, and individual resilient means for each roller carried by said cage rings, the resilient means for one-half of said rollers being carried by one cage ring and the resilient means for the remaining half of said rollers being carried by the other cage ring, said resilient means engaging and exerting pressure on one end of its associated roller to bias its opposite end against said guide flange means.

2. A roller bearing according to claim 1 wherein the said individual resilient means consists of a resilient washer confined under compression between an end of the appurtenant roller and the cage ring carrying said resilient means.

3. A roller bearing according to claim 2 including two rows of rollers, a common centrally located guide flange for the rollers of both rows, and cage means common to the rollers of both rows, and wherein the said resilient washers press the respective rollers of the two rows against the common guide flange.

4. A roller bearing according to claim 2 wherein the washers are supported against a face of the cage ring and between said face and the ends of the respective rollers.

5. A roller bearing according to claim 1 including two rows of rollers, a common centrally located guide-flange for the rollers of both rows, and cage means common to the rollers of both rows, and wherein the said resilient means press the rollers of the two rows against the common guide flange.

6. A roller bearing according to claim 1 wherein the individual resilient means are integral with the cage ring.

7. A roller bearing having a single row of cylindrical rollers, guide flanges at both ends of the rollers and individual resilient means for each roller, selected resilient means pressing their associated rollers against one of the said flanges and the remaining resilient means pressing their associated rollers against the other of said flanges.

8. A bearing according to claim 7 wherein there is an even number of rollers, and said selected resilient means alternate with the remaining resilient means to thereby provide equal wear upon both of said guide flanges.

References Cited in the file of this patent

UNITED STATES PATENTS

| | | |
|---|---|---|
| 1,301,389 | Conrow | Apr. 22, 1919 |
| 1,785,617 | Cowburn | Dec. 16, 1930 |
| 1,931,073 | Herrmann | Oct. 17, 1933 |
| 1,985,693 | Robinson | Dec. 25, 1934 |
| 2,044,663 | Brodin | June 16, 1936 |

FOREIGN PATENTS

| | | |
|---|---|---|
| 230,251 | Great Britain | Mar. 12, 1925 |